(12) United States Patent
Lagoutte

(10) Patent No.: US 7,280,494 B2
(45) Date of Patent: Oct. 9, 2007

(54) METHOD AND SYSTEM FOR THE EXCHANGE OF INFORMATION BETWEEN A MAIN STATION AND A CLUSTER OF MOBILE STATIONS

(75) Inventor: Pierre Lagoutte, Dracy les Couches (FR)

(73) Assignee: Thales, Paris (FR)

( * ) Notice: Subject to any disclaimer, the term of this patent is extended or adjusted under 35 U.S.C. 154(b) by 817 days.

(21) Appl. No.: 10/012,316

(22) Filed: Dec. 12, 2001

(65) Prior Publication Data

US 2002/0089962 A1 Jul. 11, 2002

(30) Foreign Application Priority Data

Dec. 13, 2000 (FR) .................................. 00 16413

(51) Int. Cl.
*H04Q 7/20* (2006.01)

(52) U.S. Cl. .................... 370/310.2; 370/338; 455/450; 455/464

(58) Field of Classification Search ................. 370/310, 370/315, 316, 349, 338, 310.2; 455/427, 455/430, 432.1, 464, 450
See application file for complete search history.

(56) References Cited

U.S. PATENT DOCUMENTS

| 4,424,417 | A |  | 1/1984 | Chavey et al. ............... 370/319 |
|---|---|---|---|---|
| 4,785,464 | A |  | 11/1988 | Judeinstein et al. ........ 375/211 |
| 4,999,835 | A |  | 3/1991 | Lagoutte ...................... 370/389 |
| 5,117,429 | A |  | 5/1992 | Lagoutte ...................... 370/413 |
| 5,548,585 | A |  | 8/1996 | Lagoutte et al. ............ 370/469 |
| 5,636,047 | A |  | 6/1997 | Lagoutte et al. ............ 398/164 |
| 5,682,139 | A | * | 10/1997 | Pradeep et al. ........ 340/539.13 |
| 5,757,770 | A |  | 5/1998 | Lagoutte et al. ............ 370/389 |
| 6,032,041 | A | * | 2/2000 | Wainfan et al. ............. 455/427 |
| 6,034,635 | A | * | 3/2000 | Gilhousen ................... 342/457 |
| 6,490,453 | B1 | * | 12/2002 | Lee et al. .................... 455/450 |
| 6,693,892 | B1 | * | 2/2004 | Rinne et al. ................. 370/348 |
| 6,907,257 | B1 | * | 6/2005 | Mizutani et al. ............ 455/464 |
| 6,917,983 | B1 | * | 7/2005 | Li .............................. 709/238 |

* cited by examiner

*Primary Examiner*—Chi Pham
*Assistant Examiner*—Shick Hom
(74) *Attorney, Agent, or Firm*—Oblon, Spivak, McClelland, Maier & Neustadt, P.C.

(57) ABSTRACT

A method and system for determining a path between a cluster which has a plurality of mobile stations and a main station and/or a zone network. The cluster is linked with the main station and/or the zone network by a long-range link. The method includes transmitting pieces of information between the cluster and the main station and/or the zone network via the long-range link, determining a first piece of information properly received by one of the mobile stations, designating the mobile station that receives the first piece of information properly received as an associated mobile station, and associating with the associated mobile station a preferred path to be taken by all or a majority of pieces of information to be transmitted between the cluster and the main station and/or the zone network.

22 Claims, 2 Drawing Sheets

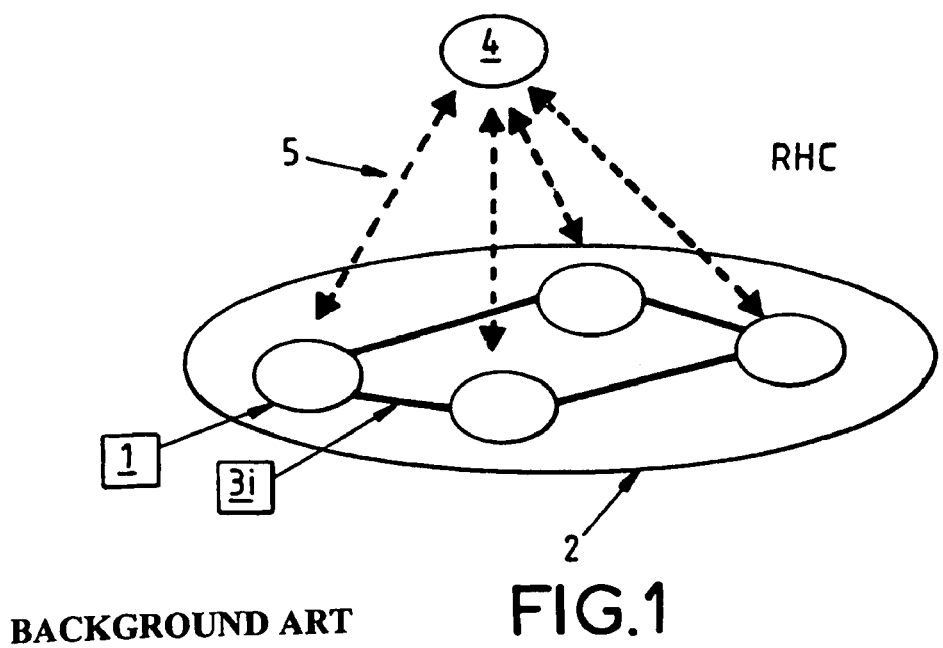
BACKGROUND ART FIG.1
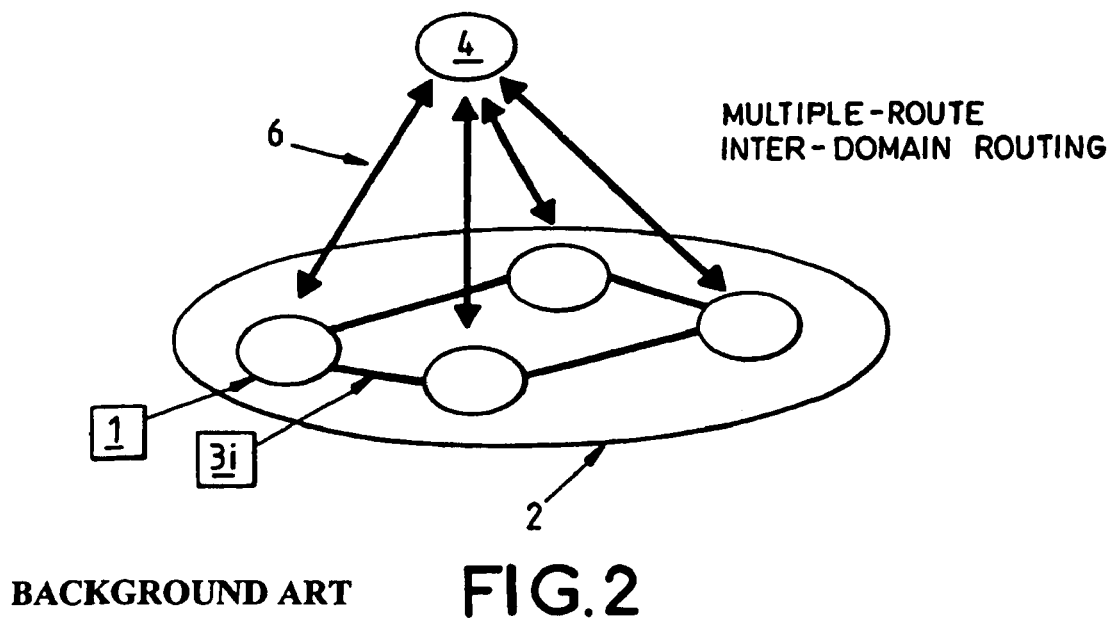
BACKGROUND ART FIG.2

METHOD AND SYSTEM FOR THE EXCHANGE OF INFORMATION BETWEEN A MAIN STATION AND A CLUSTER OF MOBILE STATIONS

BACKGROUND OF THE INVENTION

1. Field of the Invention

The invention pertains to a method and a system adapted to the exchange of information between a main base station and a set of mobile stations assembled for example in a "cluster", a cluster and main station being connected by means of a "long-range" communications link.

It can be applied especially to resolving the problem of the general connectivity of a fleet of mobile vehicles with respect to a remote, main base station in taking utmost advantage of the dispersal and relative proximity of these vehicles, in order to improve the radio link between the fleet of vehicles and the main station. The information exchanged takes the form for example of packets having a destination address, for example IP type packets.

The term "connectivity" in the present invention designates a connection potential that pre-exists even when there is no transmission of information. Hereinafter in the description, reference is made to the "internal connectivity" of a cluster forming a group of several mobile stations connected to one another by a short-range communications means, taken as a whole, and to the "external connectivity" of this cluster with the main station through the "long-range" link.

More generally, the present invention can be applied in a system comprising at least one main station linked by a "long-range" communications link to one or more clusters grouping together several mobile stations communicating by means of "short-range" links.

2. Description of the Prior Art

Certain systems have a mobile communications architecture organized into several levels of communication, for example from a main station containing data to be disseminated up to the secondary mobile stations whose function is to execute the information related to the information held and transmitted by the main station. It is thus possible to define three levels of communication:

Level 1: communications within the mobile secondary station itself,

Level 2: short-range communications between several mobile stations grouped together in one and the same network or "cluster", Level 3: long-range communications linking a cluster to a main station, in contrast with short-range communications internal to the cluster.

A communications architecture of this kind is found, for example, in a command system comprising a decision element supported by the main station:

1) the intra vehicle network conveys multiple-service information within a vehicle,
2) the inter-vehicle network enables short-range exchanges, for example exchanges in the kilometer range, between the different vehicles of one and the same group or cluster. This mode of operation may be envisaged during halts or movements with different performance characteristics in these two cases,
3) the long-range connectivity network, for example in the range of tens of kilometers, connects the cluster of vehicles to the main station. This external connectivity must be ensured in the fixed position as well as in movement, with however a service quality provided that is different in these two cases.

FIG. 1 gives a schematic view of an architecture of this type where the vehicles 1, grouped together in a cluster 2, communicate with one another through arteries $3i$, the cluster being linked to the main station 4 by means of a long-range network (RHC) 5 whose radio access center (RAC not shown in the figure) constitutes the entry point.

The idea is to make one or more main stations communicate with at least one cluster of vehicles linked to one another by an LAS (Local Area System).

In this type of architecture, each vehicle of the cluster is equipped, firstly, with a transmission means such as the inter-vehicle, wireless local area network, working at high bit rate within the cluster and, secondly, communications means comprising especially a long-range transmitter and receiver to and from the main station (not shown in the figure for reasons of clarity).

The implementation of the invention is based especially on the following assumption: the main station and the mobile inter-station network of a cluster are, broadly speaking, each considered to be an AS (Autonomous System) related to the IP network, administered by a single entity provided with an IP internal routing protocol or Interior Gateway Protocol (IPG) interfacing with the other autonomous systems by means of an EPG (Exterior Gateway Protocol) type protocol. This definition conforms to that of the IETF. It would also be possible to consider each of the two networks as sub-networks (for example OSPF or Open Shortest Path First areas) of one and the same AS IP.

In a first solution shown in FIG. 2, the two AS (or sub-networks) are connected by inter-AS (or inter-network) IP links, 6. The choice of the optimum route for the exchange of the information is set by the inter-AS (or inter sub-network) protocols, according to the standard procedures known to those skilled in the art. These procedures arbitrate on the optimal route.

However, this approach has the drawback of requiring the management of a spontaneous route instability or route flapping. Route flapping is an inevitable phenomenon and the related adjustments consume passband capacity on long-range links.

The idea of the invention relies on the novel approach which consists especially in connecting the two fields or sub-networks mentioned, namely the cluster and the main station, by an inter domain (or inter-sub-network) type link unique to the IP level. The routing then has only one route between the main station and the entire cluster. The alternating transmission paths of this route are determined and managed by the method and system according to the invention.

SUMMARY OF THE INVENTION

The object of the invention relates to a method for exchanging information between at least one cluster comprising several mobile stations and at least one main station, or one zone network, the cluster or clusters being linked with the main station or the zone network by means of a long-range link. The method comprises at least one step for the transmission of pieces of information between the cluster and the zone network by means of a routing channel determined on the basis of an existing "internal connectivity" (LAN) between the different mobile stations and means adapted to:

the determining, at the reception level by each mobile station of a cluster and among pieces of information of a given type, of the first piece of information properly received by a mobile station, the "designating" of the associated mobile station and the associating, with this mobile station, of the preferred reverse path to be taken by all or the majority of the pieces of information to be transmitted from the cluster to the main station.

The pieces of information transmitted for example take the form of an IP packet type packet format and, the mobile stations of the cluster being linked by means of an "internal connectivity" at high bit rate, the method comprises for example the following steps:

a) Receiving, at each mobile station, the IP packets sent by the main station or the zone network and determining the first packet properly received by the receiver of a mobile station, said first packet being the chosen packet Pr, b) Identifying the receiver associated with the first chosen packet and the corresponding transmitter of the mobile station, c) Assigning said "identified" mobile station the preferred return path to be taken by the different IP packets to be sent to the main station or the zone network, through the long-range link.

The value of the ratio between the bit rate of the mobile inter-station and that of the long-range network may be greater than 10.

According to one embodiment of the method, the step a) to determine the first received packets consists, for example, for packets of a given type, in choosing the first of the packets properly received and in rejecting the other identical packets.

The invention also relates to a system for exchanging information between a main station, or a zone network, and at least one cluster comprising several mobile stations connected to one another by means of an internal connectivity. The system comprises at least one channel for the transfer of information determined on the basis of the internal connectivity at high bit rate between the mobile stations and means adapted to determining, for a given type of information, the mobile station that has received the "first piece of information" and designating said mobile station or stations as a preferred path.

The object of the invention also relates to a system for exchanging information between a zone network and at least one cluster comprising several mobile stations connected to one another, each mobile station being equipped with a routing device, an information transmission device comprising at least one transmitter and one receiver, said cluster being connected to the zone network by means of a long-range network, the system comprising at least:

an internal connectivity at high bit rate between the different mobile stations, a piece of equipment adapted to distinguishing among the set of IP packets sent by the zone network and received by each of the receivers of the mobile stations, and for a given type of packet, the first properly received packet of each of them, and to designating the mobile station that has received this first chosen packet Pr, as the "preferred return path" of the packets addressed to the zone network.

The equipment for distinguishing and assigning the "preferred return path" is for example a front device implanted in the routing function constituted by the set of physical routers of each of the vehicles.

The bit rate of the internal connectivity is for example several times the bit rate of the long-range connectivity. The value of the ratio between the bit-rate of the mobile inter-station and that of the long-range network may be greater than 10.

The system and the method according to the invention are advantageously used in a system comprising a telecommunications means supported by the main station or the zone network and several mobile stations.

The invention comprises especially the following advantages:

It makes the overall connectivity of the cluster with the main station more reliable, owing to the redundancy of the long-range transmission means of each of the vehicles or mobile stations of the cluster. Indeed, taken individually, each of the links from the main station to the cluster is flimsy and subjected to fading, firstly because of jamming and, secondly, because of link budget difficulties, it optimizes the quality of the external connectivity of the cluster with the main station, by offering the possibility of selecting the best available surviving links at any time. For example, the best pair {mobile station; main station} is chosen at any time to exchange all the information on the long-range link.

The "route flapping" phenomenon, corresponding to an instability of the chosen route owing to the existence of several possible routes and of rapidly variable quality in making the link between the main station and the cluster, is eliminated.

BRIEF DESCRIPTION OF THE DRAWINGS

Other features and advantages of the method and of the system according to the invention shall appear from the following description given with reference to the figures, of which:

FIG. 1 is a general diagram of a communications architecture between a main station and a cluster grouping together different mobile stations, FIG. 2 shows another possible communications architecture.

MORE DETAILED DESCRIPTION

In order to understand the invention more clearly, the exemplary embodiment given here below by way of an illustration that in no way restricts the scope of the invention is applied to a zone network and dedicated for example to a tactical or strategic command whose entry point (or radio access center—RAC) corresponds to the main station of the invention, and a fleet of vehicles comprising several tactical mobile vehicles corresponding to the cluster.

The idea of the invention is to manage the instantaneous paths of transmission of information between the zone network and the fleet of vehicles. The solution pertains especially to prior art architectures of Internet routing, the zone network and the inter-vehicle network of the fleet of vehicles being considered broadly speaking as two Internet Protocol ASs (Autonomous Systems of the Internet architecture). The information takes for example the form of IP packets.

Figure 3:
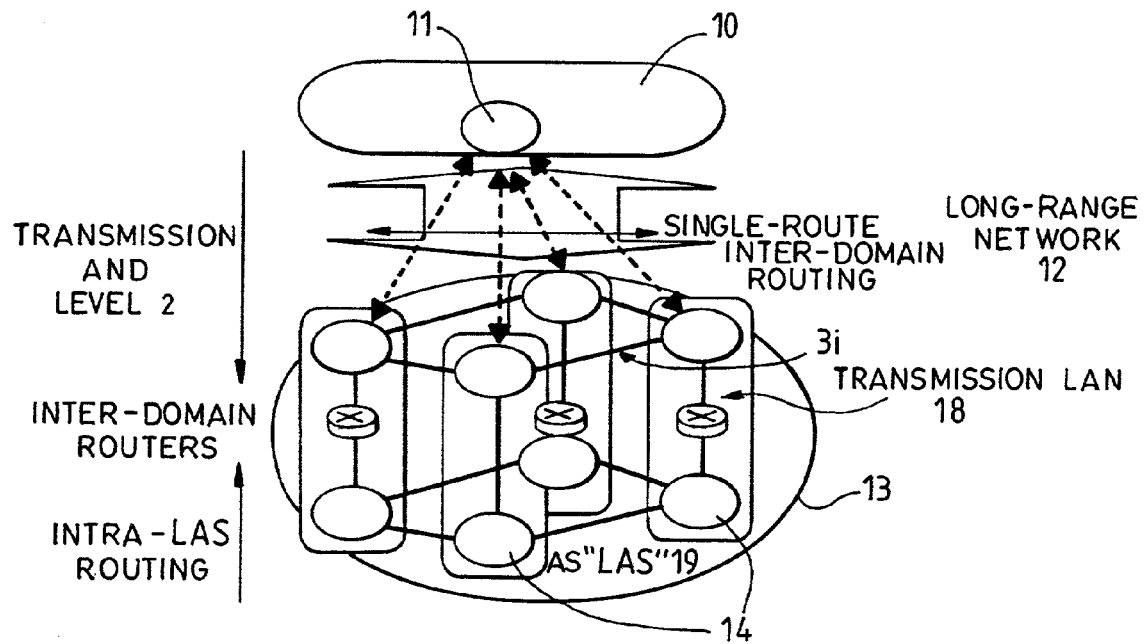
FIG. 3 shows an exemplary architecture of a communications system according to the invention.

The communications system shown in FIG. 3 comprises a zone network 10 comprising one or more radio access centers 11.

The zone network 10 is linked by means of a long-range tactical link 12 to a fleet of vehicles 13. The long-range network provides especially for a single-route inter-domain routing function. In other words, there is only one route or routing channel for the information exchanged between the zone network and the squadron.

Figure 4:
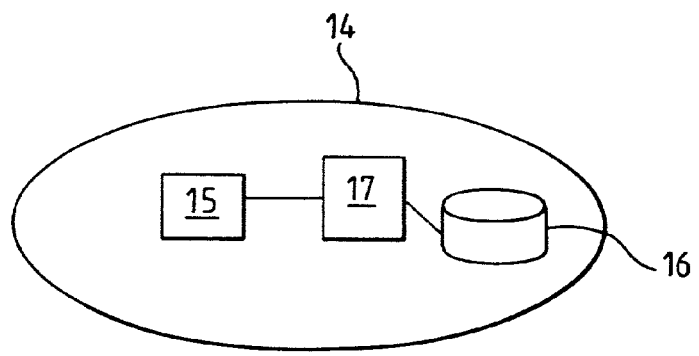
FIG. 4 shows the layout of the communications and routing means within a vehicle

The fleet of vehicles comprises several vehicles 14, forming the nodes of a high-bit-rate inter-vehicle wireless transmission LAN or local area network 18. This inter-vehicle network is connected to the zone network by a long-range tactical line 12. A vehicle 14 may be seen as a node of the cluster in which the transmission means 15 (FIG. 4) comprise especially a transmitter and a receiver, not shown for reasons of clarity, and are distinct from the routing means 16 (FIG. 4). The routing means comprise for example a routing table and routing protocols commonly used in this technical field of networks. A front device 17 such as an interface card in which an appropriate identification program is laid out in series on the flow interposed between the transmission equipment and the router of each vehicle and enables especially the "marking" of the path of the packets received by the vehicle as described here below.

Any front device 17 (FIG. 4) adapted to determining the first packet received in accordance with the method according to the invention described here below and marking the path of the packets received for their retransmission to the zone network may be used.

The transmission equipment of the LAS supported by the LAN offers high-bit-rate connectivity between the vehicles of the fleet of vehicles. The transmission LAN especially has the function of conveying the pieces of information received from the radio reception centers of all the vehicles to each of the pieces of routing equipment of each vehicle where this information is sorted out. It also supports the IP exchanges within the internal LAS (19) of the cluster (IP exchange between the vehicles of the fleet of vehicles).

The inter-vehicle bit rate of the LAS potentially has an order of magnitude greater than that of the long-range network which connects the cluster to the main station. For example, the bit rate of the arteries $3i$ LAS is in the range of some Mbps to 25 Mbps and the bit rate of the long-range link is below 1 Mbps. Preferably, the value of the ratio between the bit rate of the long-range network and the mobile inter-station bit rate is greater than 10.

The word "routing" designates the logic function formed by all the routers of each vehicle of the cluster. It is physically laid out in as many routers as there are vehicles, each of them also providing the connectivity to the fleet of vehicles of the internal networks of the vehicle in which it resides. The routers of each vehicle of a cluster are logically connected to each other by the high-bit-rate transmission LAN.

This transmission LAN provides high-bit-rate MAC (medium access control) level connectivity between the transmitters/receiver's fitted into each of the vehicles 14 and the routers 16 in charge of the long-distance connectivity in each of the vehicles. These exchanges may for example be supported by a logic construction virtually constituted on the basis of IP tunnels overlaid on the LAS: these expressions are known to those skilled in the art and shall not be described in detail in the present invention.

The system according to the invention relies especially on a management of the instantaneous transmission paths which, for example, use a single-route routing enabling communications or information exchanges between one or more radio access centers of a zone network or a main station that is an access point of the zone network and a specified cluster.

This single router is determined for example by implementing the following steps:

Step 1

Linking up the vehicles 14 of the cluster 13 by transmission and switching equipment (at the MAC level) providing high-bit-rate connectivity in the range of several Mbps, known in this example as a "transmission LAN" 18.

Step 2

The pieces of information sent by the main station (the zone network) in the form of IP packets are received by the routing level in several copies, from each of the receivers of the vehicles within range of the main station. Each vehicle receiver will send the packets Pi that it has received to the routers of the routing function. If there is no hindrance, each vehicle receives and sends the routing an identical copy of each information packet sent by the main station or the zone network. The result thereof is a duplication, after reception within the transmission LAN of the cluster, into as many copies as there are vehicles in the cluster. The packets taken into account by the method are preferably the "well-received" packets.

Step 3

The front process 17 of each router within each vehicle of the cluster carries out a function for the reduction of the copies as follows for example, the routing function determines the first properly received packet, Pr, for each type of packet, Pi, and assigns its transmitter source, namely the transmitter associated with the vehicle that has received the message or the information, the preferred path of "return" to the main station. The "preferred" path is the path toward the transmitter of the vehicle that forwards the packets whose final destination is the main station or the zone network. The transmitter chosen to re-send information is that of the vehicle whose receiver is the source of the information packet that is the first copy of all to be received. For example, the identification of the source (receiver) is made by any marking whatsoever of the IP packet sent to the routing level by the receiver, for example, the identifier, from the IP tunnels (source address), in order to convey it to the router The copies pertaining to one and the same type of information packet and arriving after the first chosen received packet, Pr, are rejected by means of the front equipment 17 positioned at the routing level. This front device is located, for example, at the level of all the physical routers forming the routing function.

the reverse path taken by the packets to be sent to the main station is then stored by the front device 17 interposed serially between the transmission equipment and the router of each vehicle, to take charge of the packets to be sent in return.

The packets sent to the RAC are thus relayed to the vehicle having the best instantaneous reception and the best return channel to the RAC.

Without departing from the scope of the invention, the system and method according to the invention are used for the exchange of information having a format type packet with a destination address such as that of IP packets or again datagram packets.

The frequency of decision modification pertaining to the optimum route between the cluster and the main station is in the range of one Hz.

What is claimed is:

1. A method for determining a preferred path between a cluster comprising a plurality of mobile stations and at least one of a main station and a zone network, and the preferred path within the cluster, the cluster being linked with at least one of the main station and the zone network by a long-range link, wherein the method comprises:

transmitting a first pieces of information to all of the mobile stations of the cluster from at least one of the main station and the zone network via a plurality of respective direct links of the long-range link;

determining one of the mobile stations of the cluster that receives the first pieces of information before any other one of the mobile stations of the cluster;

designating the one of the mobile stations of the cluster that receives the first pieces of information before any of the other mobile stations of the cluster as a preferred mobile station; and associating with the preferred mobile station the preferred path within the cluster, between any of the mobile stations of the cluster and the preferred mobile station, and the preferred path between the preferred mobile station of the cluster and at least one of the main station and the zone network to be taken by all or a majority of second pieces of information, said second pieces of information destined to or from at least one of the main station and the zone network, to be transmitted between any of the mobile stations of the cluster and the preferred mobile station and between the preferred mobile station and at least one of the main station and the zone network via the preferred path.

2. The method according to claim 1, wherein the pieces of information transmitted include datagrams.

3. The method according to claim 1, wherein a value of the ratio between a bit rate of the connectivity and a bit rate of the long-range link is greater than 10.

4. The method according to claim 1, wherein the determining further comprises choosing one of the first pieces of information properly received before an identically transmitted first piece of information.

5. The method according to claim 1, wherein the connectivity uses datagram packets.

6. The method according to claim 2, wherein a value of the ratio between a bit rate of a connectivity and a bit rate of the long-range link is greater than 10.

7. The method according to claim 2, wherein the connectivity uses datagram packets.

8. The method according to claim 3, wherein the connectivity uses datagram packets.

9. The method according to claim 4, wherein the connectivity uses datagram packets.

10. A system for determining a preferred path between a cluster comprising a plurality of mobile stations and at least one of a main station and a zone network, and the preferred path within the cluster, the cluster being linked to at least one of the main station and the zone network by a long-range link, the system comprising:

a plurality of mobile stations connected to one another by a connectivity forming the cluster;

each mobile station including a transmitter, a receiver, and a routing device configured to route within the cluster and between the cluster and at least one of the main station and the zone network according to the preferred path;

a distinguishing device configured to distinguish among packets of a predetermined type of packet sent by the main station or the zone network to the mobile stations, receive a copy of the predetermined type of packet from one mobile station that properly receives the predetermined type of packet before any other one of the mobile stations, and designate the one mobile station that first properly receives the predetermined type of packet as a preferred mobile station for the preferred path for transmission of packets, said packets destined to or from at least one of the main station and the zone network, between any of the mobile stations of the cluster and the preferred mobile station and between the preferred mobile station of the cluster and at least one of the main station and the zone network via the preferred path.

11. The system according to claim 10, wherein a ratio between a bit rate of the connectivity and a bit rate of the long-range network is greater than 10.

12. The system according to claim 10, wherein the distinguishing device is associated with a routing device of each of the mobile stations.

13. The system according to claim 10, wherein the connectivity has a Media Access Control level between transmitters/receivers and routing devices of the mobile stations.

14. The system according to claim 11, wherein the distinguishing device is associated with a routing device of each of the mobile stations.

15. The system according to claim 11, wherein the connectivity has a Media Access Control level between transmitters/receivers and routing devices of the mobile stations.

16. The system according to claim 12, wherein the connectivity has a Media Access Control level between transmitters/receivers and routing devices of the mobile stations.

17. A path finding device for determining a preferred path from at least one of a network and a main station via a long-range link to a cluster having a plurality of mobile stations, and the preferred path within the cluster, said path finding device comprising:

a receiving device configured to receive data transmitted from the network or the main station to the cluster via the long-range link;

means for designating one of the mobile stations that properly receives said data, before any other one of the mobile stations, as a preferred mobile station for the preferred path between any of the mobile stations of the cluster and the preferred mobile station, and between the preferred mobile station of the cluster and at least one of the network and the main station, wherein said preferred path is used in subsequent transmission of data, said data destined to or from at least one of the network and the main station, between any of the mobile stations of the cluster and the preferred mobile station and between the preferred mobile station and at least one of the network and the main station via the preferred path.

18. The device according to claim 17, wherein said data includes a datagram.

19. The device according to claim 17, wherein the mobile stations of the cluster are connected by a connectivity which uses datagrams.

20. The device according to claim 17, wherein the mobile stations of the cluster are connected by a connectivity having a Media Access Control level between transmitters/receivers and routing devices of the mobile stations.

21. A system for determining a preferred path between a cluster comprising a plurality of mobile stations and at least one of a main station and a zone network, and the preferred path within the cluster, the cluster being linked to at least one of the main station and the zone network by a long-range link, the system comprising:

a plurality of mobile stations connected to one another by a connectivity forming the cluster;

each mobile station including a transmitter, a receiver, and a routing device configured to route within the cluster and between the cluster and at least one of the main station and the zone network according to the preferred path;

a distinguishing device configured to distinguish among packets of a predetermined type of packet sent by the main station or the zone network to the mobile stations, receive a copy of the predetermined type of packet from one mobile station that properly receives the predetermined type of packet before any other one of the mobile stations, and designate the one mobile station that first properly receives the predetermined type of packet as a preferred mobile station for the preferred path for transmission of packets, said packets destined to or from at least one of the main station and the zone network, between any of the mobile stations of the cluster and the preferred mobile station and between the preferred mobile station of the cluster and at least one of the main station and the zone network via the preferred path;

wherein the connectivity has a Media Access Control level between transmitters/receivers and routing devices of the mobile stations.

22. The method according to claim 1, further comprising a fleet of vehicles in communication with at least one of the main station and the zone network.

\* \* \* \* \*